US011815462B2

(12) United States Patent
Finnie et al.

(10) Patent No.: US 11,815,462 B2
(45) Date of Patent: Nov. 14, 2023

(54) BROADBAND RAMAN EXCITATION SPECTROSCOPY WITH STRUCTURED EXCITATION PROFILES

(71) Applicant: National Research Council of Canada, Ottawa (CA)

(72) Inventors: Paul Finnie, Ottawa (CA); Jacques Lefebvre, Stoneham-et-Tewkesbury (CA)

(*) Notice: Subject to any disclaimer, the term of this patent is extended or adjusted under 35 U.S.C. 154(b) by 92 days.

(21) Appl. No.: 17/614,396

(22) PCT Filed: Jun. 18, 2020

(86) PCT No.: PCT/IB2020/055736
§ 371 (c)(1),
(2) Date: Nov. 26, 2021

(87) PCT Pub. No.: WO2020/255034
PCT Pub. Date: Dec. 24, 2020

(65) Prior Publication Data
US 2022/0228991 A1    Jul. 21, 2022

Related U.S. Application Data

(60) Provisional application No. 62/864,052, filed on Jun. 20, 2019.

(51) Int. Cl.
*G01J 3/44* (2006.01)
*G01N 21/65* (2006.01)

(52) U.S. Cl.
CPC ..... *G01N 21/65* (2013.01); *G01N 2201/0633* (2013.01)

(58) Field of Classification Search
CPC .......... G01N 21/65; G01J 3/0297; G01J 3/18; G01J 3/14; G01J 3/02; G01J 3/44
See application file for complete search history.

(56) References Cited

U.S. PATENT DOCUMENTS 7,812,311 B2   10/2010  DeCamp et al.
8,958,156 B1*   2/2015  Erdogan ............... G02B 5/288
                                            359/586
(Continued)

FOREIGN PATENT DOCUMENTS

CN    107290056 A    10/2017
CN    207007336 U     2/2018
(Continued)

OTHER PUBLICATIONS

International Search Report and Written Opinion on PCT/IB2020/055736 dated Oct. 2, 2020.
(Continued)

*Primary Examiner* — Abdullahi Nur
(74) *Attorney, Agent, or Firm* — BRUNET & CO., LTD.; Hans Koenig; Robert Brunet

(57) ABSTRACT

Devices and methods to perform Raman spectroscopy with a structured excitation profile to obtain a Raman excitation map. A device includes a broadband light source to emit a broadband light beam and excitation optics to disperse the broadband light beam to strike a sample as incident light according to a structured excitation profile. The device further includes analysis optics to collect scattered light scattered by the incident light striking the sample, block Rayleigh scatter from the collected scattered light in a manner complementary to the structured excitation profile, and direct Raman scatter from the collected scattered light to a sensor to generate a signal to form a Raman excitation map.

12 Claims, 9 Drawing Sheets

(56) References Cited

U.S. PATENT DOCUMENTS

| | | |
|---|---|---|
| 2005/0283058 A1 | 12/2005 | Choo-Smith et al. |
| 2009/0073432 A1* | 3/2009 | Jalali ............... G01N 21/65 356/301 |
| 2009/0306521 A1* | 12/2009 | Ermakov ............ A61B 5/0075 600/587 |
| 2010/0291599 A1 | 11/2010 | Tague, Jr. et al. |
| 2011/0292376 A1 | 12/2011 | Kukushkin et al. |
| 2012/0314206 A1 | 12/2012 | Spizig et al. |
| 2013/0231573 A1* | 9/2013 | Zeng ................. A61B 5/0084 600/476 |
| 2015/0300881 A1* | 10/2015 | Takenaka ............ G01N 21/47 356/72 |
| 2017/0138860 A1 | 5/2017 | Huang |
| 2018/0136043 A1 | 5/2018 | Arnold et al. |
| 2018/0356341 A1 | 12/2018 | Muldoon et al. |

FOREIGN PATENT DOCUMENTS

| | | |
|---|---|---|
| CN | 108414087 A | 8/2018 |
| WO | 2017/205857 A1 | 11/2017 |

OTHER PUBLICATIONS

Adami R, et al. Analyst, 2013, 138, 6258.
Duarte AS, et al. Nano Lett. 2013, 13, 697-702.
Finnie P, et al. Scientific Reports (2020) 10:9172.
Greer JS, et al. J. Raman Spectrosc. 2013, 44, 1058-1059.
Kiefer J, Meas. Sci. Technol. (2017) 28 067001.
Krause S, et al. Scientific Reports (2018) 8:11621.
Lefebvre J. ACS Nano 2016, 10, 9602-9607.
Li Y, et al. IEEE Photonics Journal. (2017) 9(4), 3900807.
Lu F-K, et al. Mol Phys. 2012; 110(15-16): 1927-1932.
Sturzl N, et al. Anal. Chem. 2013, 85, 4554-4559.

* cited by examiner

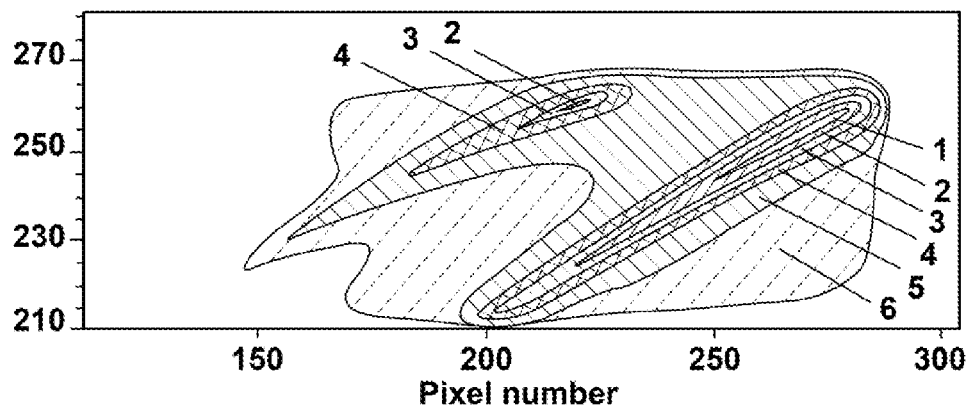
FIG. 2D
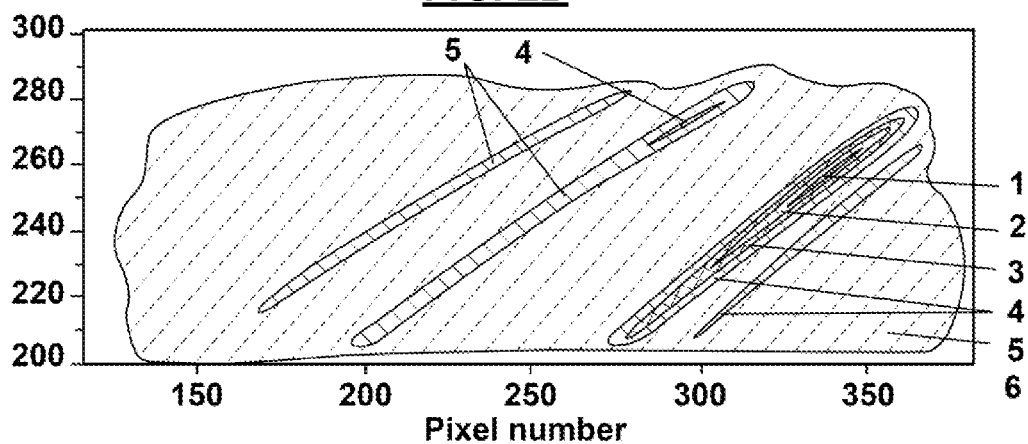
FIG. 2E
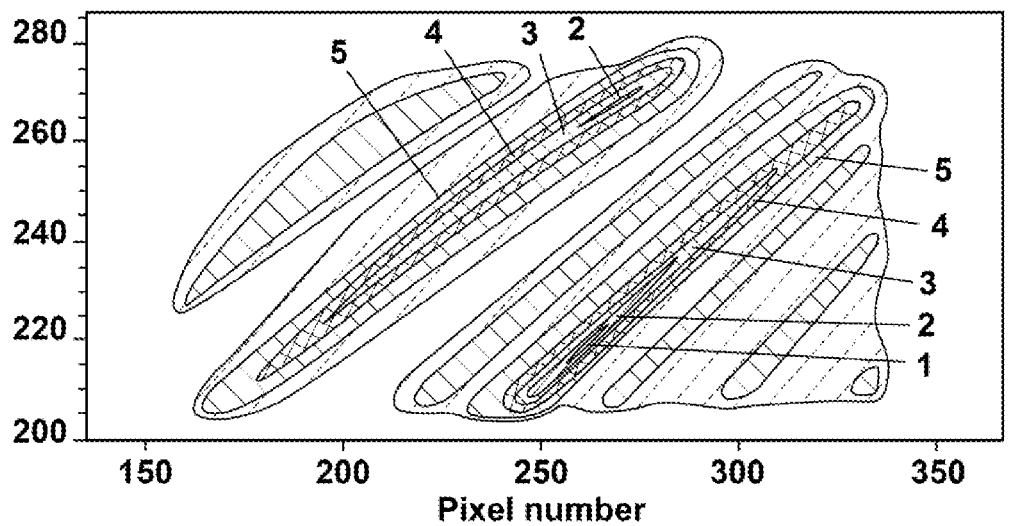
FIG. 2F
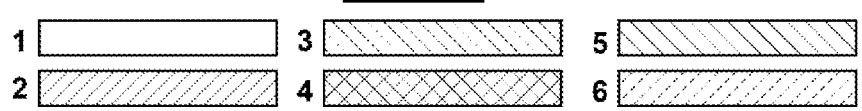

BROADBAND RAMAN EXCITATION SPECTROSCOPY WITH STRUCTURED EXCITATION PROFILES

CROSS-REFERNCE TO RELATED APPLICATION

This application is a national phase entry of International Application PCT/IB2020/055736 filed Jun. 18, 2020 and claimes the benefit of, and priority from, US Provisional Patent Application No. 62/864,052, filed on Jun. 20, 2019, which is incorporated herein by reference in its entirety.

FIELD

The present specification relates to Raman spectroscopy.

BACKGROUND

Raman spectroscopy is a spectroscopic technique used to study vibrational, rotational, and other frequency modes in a sample. Raman spectroscopy is used in chemistry to study chemical bonding and to identify molecules based on a molecule's vibrational fingerprint. These techniques can be extended to nanotechnology to analyze the structure of carbon nanotubes, nanowires, and other molecular nanostructures.

Raman spectroscopy involves exciting a sample with a known light source, typically a monochromatic laser, and measuring inelastic scattering (Raman scattering) emitted from the sample. Elastic scattering (Rayleigh scattering) is blocked by a notch filter, edge pass filter, band pass filter, or other filter, while the remaining Raman scatter is directed onto a sensor for analysis.

Raman excitation mapping is the performance of Raman spectroscopy over a range of wavelengths to develop a two-dimensional "map" of Raman scatter emitted in response to a range of excitation wavelengths. Each excitation wavelength is generally tested independently, such as by a combination of lasers and filters, or by adjusting tunable lasers and tunable filters for each excitation wavelength.

SUMMARY

According to an aspect of the specification, devices and methods are provided to obtain Raman excitation maps using broadband light structured according to a structured excitation profile. Broadband light is emitted and dispersed onto a sample according to a structured excitation profile. Rayleigh scatter is blocked in a manner complementary to the structured excitation profile. The remaining Raman scatter is collected for analysis.

Since broadband light is used, and since Rayleigh scatter is blocked in a manner complementary to the structured excitation profile, a sample may be simultaneously analyzed against a range of excitation wavelengths. In other words, broadband or "full-color" Raman spectroscopy is achieved without the adjustment of tunable light sources and/or filters and without the provision of multiple combinations of light sources and filters.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2D, 2E, and 2F are a black-and-white illustrations of the plots of FIGS. 2A, 2B, and 2C, respectively.

DETAILED DESCRIPTION

Figure 1:
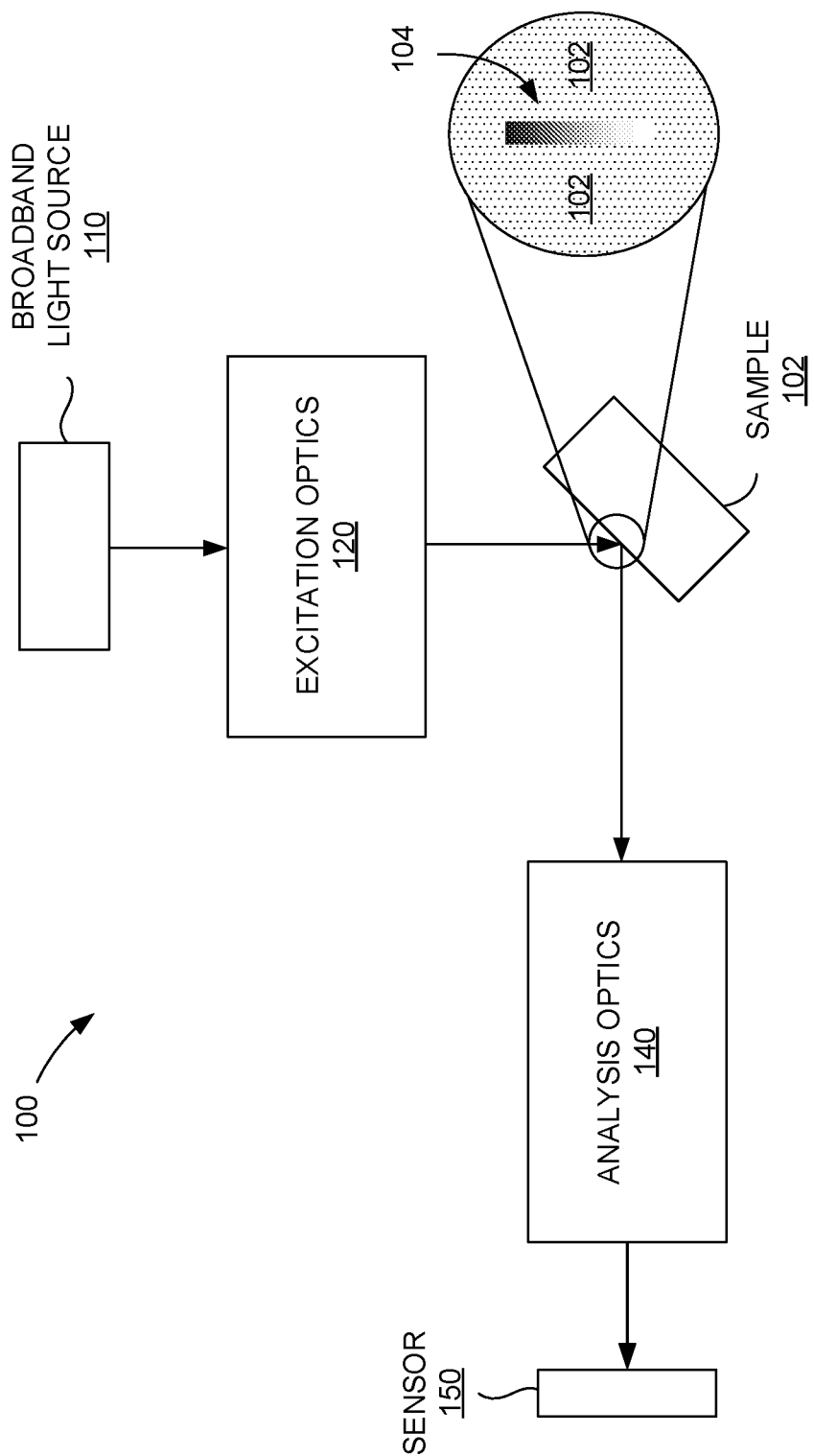
FIG. 1 is a schematic diagram of an example device to perform Raman spectroscopy with a structured excitation profile to obtain a Raman excitation map.

FIG. 1 is a schematic diagram of an example device 100. The device 100 includes a broadband light source 110 to emit a broadband light beam. The device 100 further includes excitation optics 120 to disperse the broadband light beam to strike a sample 102 as incident light according to a structured excitation profile 104, and analysis optics 140 to block the corresponding Rayleigh scatter and direct the remaining Raman scatter to a sensor 150 for analysis.

The structured excitation profile 104 achieved by the excitation optics 120 is a schema for dispersing incident light against the sample 102. The dispersal may be one or more of spatial, spectral, temporal, and may be made according to any photonic property of light, such as spectral, polarization, intensity, or another photonic property of light.

In Raman spectroscopy, the structured excitation profile 104 may include a spatial dispersal of light by wavelength. In other applications, the structured excitation profile 104 may include a spatial dispersion of light by polarization, intensity, or another photonic property. In some examples, the dispersal may also be spectral, or of another property of the incident light. Non-limiting examples are provided herein in which the structured excitation profile 104 is spatially dispersed by wavelength.

The structured excitation profile 104 is shown by way of example as "rainbow" line in which incident light against the sample 102 is spatially dispersed according to wavelength, but this example is provided for illustrative purposes only, and it should be understood that other structured excitation profiles 104 are contemplated. For example, the incident light may be dispersed as an array of points, a checkerboard pattern, or according to another spatial configuration, and may be combined with spectral, polarization, intensity, or other dispersion according to a photonic property. For example, the structured excitation profile 104 may include a checkerboard dispersion provided by bandpass filters passing certain bands of excitation light in the excitation optics 120 and bandpass filters blocking these bands in the analysis optics 140.

The analysis optics 140 includes collection optics to collect scattered light from the sample 102. The analysis optics 140 further includes an element complementary to one or more elements of the excitation optics 120 that form the structured excitation profile 104 to block Rayleigh scatter in a manner complementary to the structured excitation profile. Thus, the analysis optics 140 are to collect scattered light scattered by the incident light striking the sample, block Rayleigh scatter from the collected scattered light in a manner complementary to the structured excitation profile 104, and direct Raman scatter from the collected scattered light to a sensor 150 to generate a signal to form a Raman excitation map. The collection optics may be selected to reduce optical aberrations from the collected scattered light, and thus may include apochromatic objective lenses, or other devices to reduce optical aberrations.

Since the broadband light source 110 provides broadband light, and since the analysis optics 140 has one or more elements for blocking Rayleigh scatter in a manner complementary to the structured excitation profile 104, the sample 102 may be simultaneously analyzed upon excitation by incident light having a range of properties. For example, in Raman spectroscopy, the sample 102 may be analyzed upon excitation by incident light having a range of wavelengths simultaneously, and thus, such a technique may be referred to as broadband or "full-color" Raman spectroscopy. It is to be understood that the term "full-color" does not necessarily imply analysis over the entire visible spectrum, or indeed any particular band of wavelengths, but rather the term is meant to convey simultaneous analysis over a desired band of wavelengths suitable for conducting a particular analysis.

Since the device 100 does not require adjustment of light sources and/or filters for testing different excitation wavelengths, a two-dimensional Raman excitation map of the sample 102 may be obtained quickly and at low cost. Analyzing samples simultaneously across a range of wavelengths may be particularly useful for obtaining Raman excitation maps of materials for which testing with several different excitation wavelengths is useful, such as in the case of carbon nanotubes or other nanostructures.

As discussed above, the excitation optics 120 and the analysis optics 140 include complementary elements so that the Rayleigh scatter from the sample 102 is blocked for incident light having a range of properties simultaneously. As one example of complementary elements, the excitation optics 120 may include a short-wave pass filter to filter the broadband light beam prior to dispersal, and the analysis optics 140 may include a long-wave pass filter complementary to the short-wave pass filter to block corresponding Rayleigh scatter. That is, the short-wave pass filter cut-on is at or near the long-wave pass filter cut-off. Further details of such an example device are provided with reference to FIG. 3, below. As another example of complementary elements, spectral filtering in the excitation optics 120 may be omitted, and rather the analysis optics 140 may include a broadband or "full-color" filter having a mask structured complementarily to the structured excitation profile 104 to block the Rayleigh scatter. Further details of such an example device are provided with reference to FIG. 5, below.

Other examples of complementary elements include an etalon-like filter in the excitation optics 120 and a spectrally complementary etalon-like filter in the analysis optics 140 to obtain a Raman excitation map in both the Stokes and anti-Stokes regions. Further, a series of different filters may be used with different edges (e.g. 532 nm, 633 nm, and 785 nm low-pass filters) may be used in the excitation optics 120 and a spatially varying edge which complements the corresponding structured excitation profile may be used in the analysis optics 140.

In some examples the broadband light source 110 may be a supercontinuum broadband light source, and thus the broadband light beam may include collimated light. Collimated light may be particularly useful for forming a structured excitation profile 104. In such examples, the analysis optics 140 may include a collimator to re-collimate the collected scattered light prior to blocking the Rayleigh scatter. In such examples, the analysis optics 140 may further include a confocal stage to focus the collected scattered light at a focal plane, re-disperse, and re-collimate the collected scattered light prior to the blocking of Rayleigh scatter. Such a confocal stage may assist with avoiding the generation of unwanted stray light.

Figure 2A:
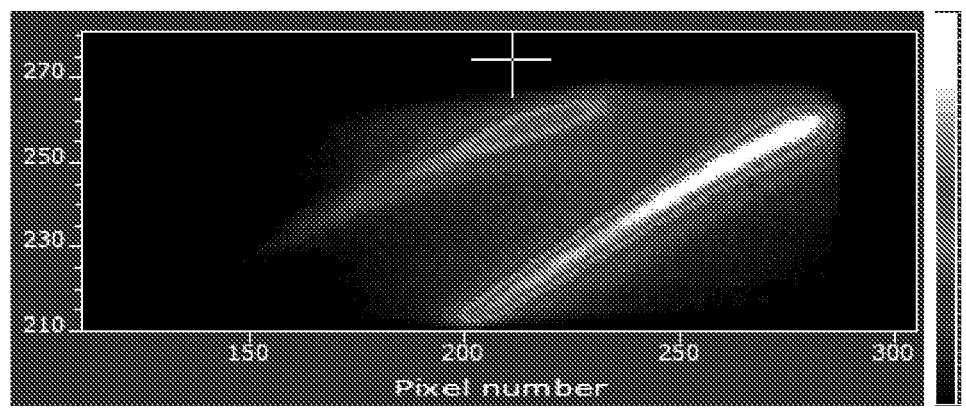
FIGS. 2A, 2B, and 2C are colored plots of example Raman excitation maps obtained using a device to perform Raman spectroscopy with a structured excitation profile.
Figure 2B:
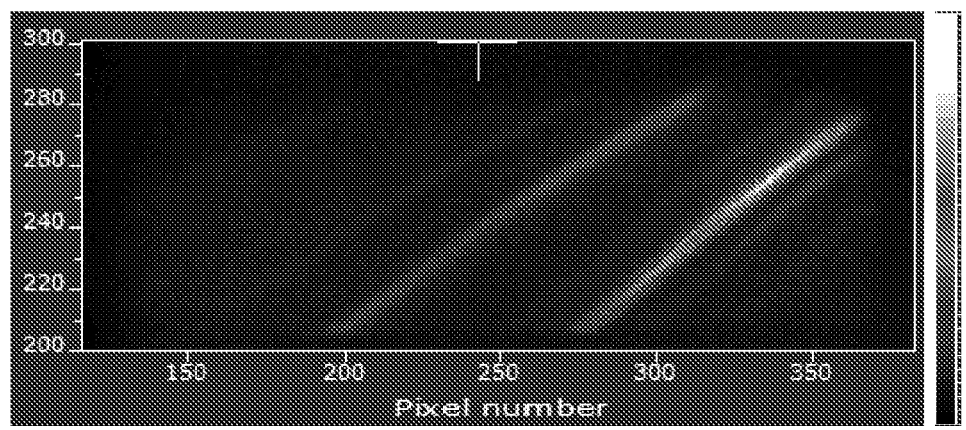
Figure 2C:
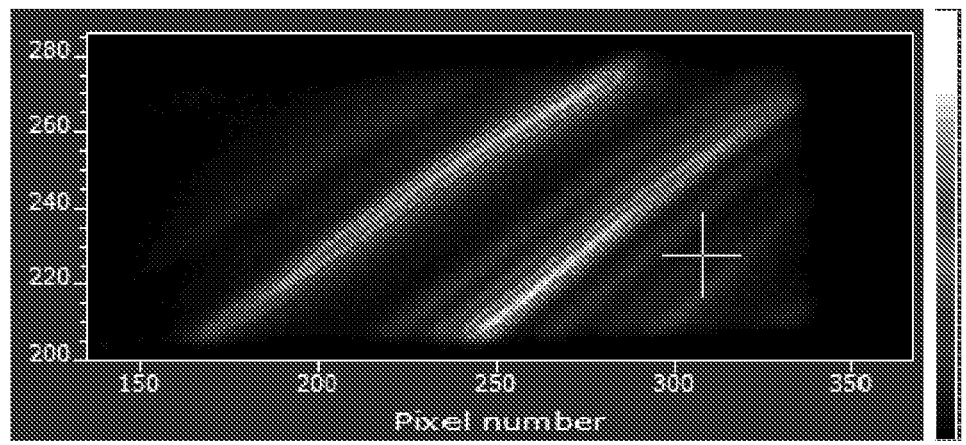

FIGS. 2A, 2B, and 2C are colored plots of example Raman excitation maps obtained using a device similar to the device 300 of FIG. 3, discussed below, using a structured excitation profile spanning green-to-red excitation. Excitation wavelengths are plotted along the Y-axes in pixels arbitrarily calibrated to units of nanometers so that each pixel spacing corresponds to about 1 nm in wavelength. Substantially "green" excitation is plotted toward the bottom of the plots, and substantially "red" excitation is plotted toward the top of the plots. The wavelength of the Raman shifted, scattered light is plotted along the X-axie. The X-axes are labeled in pixel unit corresponding to about 800 nm at the extreme right, and about 633 nm at the extreme left, with each pixel corresponding to approximately 1 nm. Raman scattering therefore produces a nearly diagonal line, with Raman shift increasing to the left. The intensity of Raman-shifted scatter observed is provided in arbitrary units mapped to color, with the lowest intensity regions shown in black, and the highest intensity regions shown in white. Each plot includes a legend indicating the mapping of intensity of observed Raman scatter to plotted color.

FIG. 2A shows a Raman excitation plot obtained from analysis of raw single-wall carbon nanotubes. FIG. 2B shows a Raman excitation plot obtained from analysis of (6,5) sorted carbon nanotubes. FIG. 2C shows a Raman excitation plot obtained from analysis of (7,5) sorted carbon nanotubes. These plots are provided for illustrative purposes only. The device used to obtain the Raman excitation maps may be tuned by way of adjusting grating tilts, entrance pupil sizes of excitation optics and/or analysis optics, etc., to achieve a desired spectral mapping. Such broadband Raman excitation plots, which span hundreds of nanometers of excitation wavelengths, may be obtained at high speeds using a device similar to the device 300, such as, for example, within milliseconds.

FIGS. 2D, 2E, and 2F are a black-and-white illustrations of the plots of FIGS. 2A, 2B, and 2C, respectively. The colors shown in the colored plots are mapped arbitrarily to six hashed regions 1, 2, 3, 4, 5, and 6 to illustrate regions of different intensity. These plots are provided for illustrative purposes only.

Figure 3:
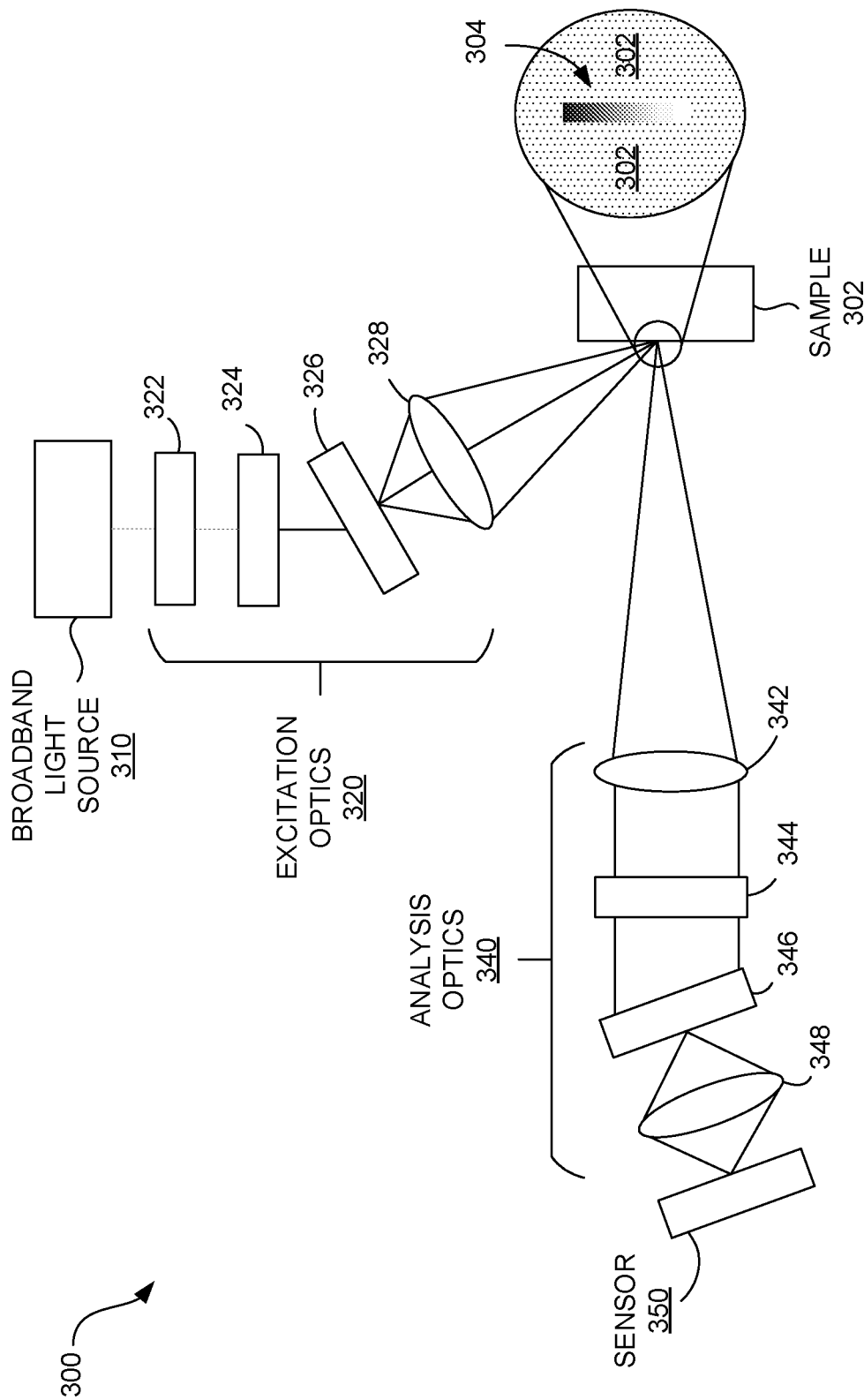
FIG. 3 is a schematic diagram of another example device to perform Raman spectroscopy with a structured excitation profile to obtain a Raman excitation map, the device including a short-wave pass filter and a complementary long-wave pass filter.

FIG. 3 is a schematic diagram of another example device 300 to perform Raman spectroscopy with a structured excitation profile 304 to obtain a Raman excitation map. The device 300 may be similar to the device 100 of FIG. 1, with like elements numbered in the "300" series rather than the "100" series, and thus for like elements, reference to the description of the device 100 of FIG. 1 may be made.

The device 300 includes a broadband light source 310. The device 300 further includes excitation optics 320, which include an excitation filter such as a short-wave pass filter 324 to spectrally filter the broadband light beam, an excitation grating 326 to spatially disperse the broadband light beam by wavelength, and an excitation lens 328 to direct the incident light to the sample 302. The excitation lens 328 may include an achromatic lens, a microscopic objective lens, or a cylindrical lens. Additional excitation lenses may be used to direct the incident light on the sample 302. Care may be taken to ensure that the sample 302 is substantially homogenous and flat beneath the incident light.

The spectral filtering provided by the short-wave pass filter 324 along with the spatial dispersion provided by the excitation grating 326 constitute the structured excitation profile 304. Thus, the excitation optics 320 disperse the broadband light beam to strike the sample 302 as incident light in a structured excitation profile 304. Further examples of structured excitation profiles 304 are discussed above with reference to FIG. 1.

The device 300 further includes analysis optics 340. The analysis optics 340 include a collection lens 342 to collect scattered light scattered from the sample 302, an emission filter complementary to the excitation filter, such as a long-wave pass filter 344 complementary to the short-wave pass filter 324, to spectrally filter the collected scattered light, an emission grating 346 to spatially disperse the collected scattered light, and a transmission lens 348 to direct the collected scattered light to a sensor 350 for analysis. Thus, the analysis optics 340 are to collect scattered light scattered by the incident light striking the sample 302, block Rayleigh scatter from the collected scattered light in a manner complementary to the structured excitation profile 304, and direct Raman scatter from the collected scattered light to a sensor 350 to generate a signal to form a Raman excitation map.

An example of a long-wave pass filter 344 that is complementary to the short-wave pass filter 324 is a 633-nanometer long-wave pass filter complementary to a 633-nanometer short-wave pass filter. The excitation grating 326 and emission grating 346 may include volume phase holographic (VPH) gratings. The emission grating 346 is tilted on a perpendicular axis with respect to the excitation grating 326. The gratings 326, 346 may disperse light to substantially the same or similar degree for the generation of substantially square Raman excitation plots with substantially square pixels.

The excitation optics 320 may further include a clean-up filter 322 between the broadband light source 310 and the short-wave pass filter 324 to eliminate photons at unwanted wavelengths, such as in the near infrared (NIR) range, which may be generated by the broadband light source 310, and which may heat or damage the sample, and may constitute a source of noise in the optical system.

In some examples, the broadband light source 310 may include a supercontinuum broadband light source, and thus the broadband light beam may include collimated broadband light. Further, the analysis optics 340 may include a confocal stage to focus the collected scattered light at a focal plane, re-disperse, and re-collimate the collected scattered light prior to the blocking of Rayleigh scatter.

Figure 4:
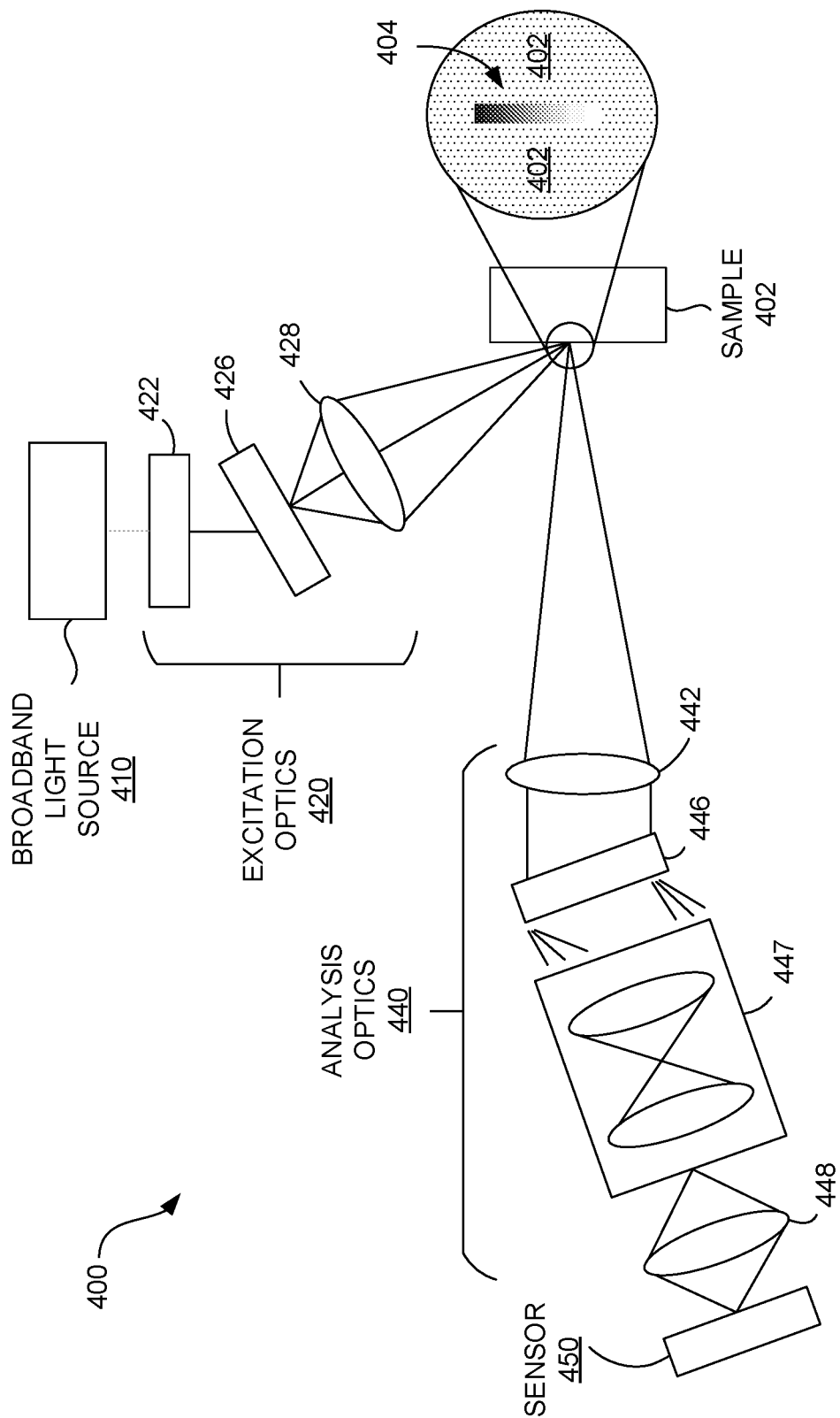
FIG. 4 is a schematic diagram of another example device to perform Raman spectroscopy with a structured excitation profile to obtain a Raman excitation map, the device including a broadband or "full-color" filter with a mask structured complementarily to the structured excitation profile.

FIG. 4 is a schematic diagram of another example device 400 to perform Raman spectroscopy with a structured excitation profile 404 to obtain a Raman excitation map The device 400 may be similar to the devices 100 and 300 of FIGS. 1 and 3 respectively, with like elements numbered in the "400" series rather than the "100" and "300" series respectively, and thus for like elements, reference to the description of the devices 100 and 300 of FIGS. 1 and 3 may be made. However, in contrast to the device 300 of FIG. 3, in the device 400, spectral filtering in the excitation optics may be omitted and the analysis optics may include a broadband or "full-color" filter.

The device 400 includes a broadband light source 410. The device 400 further includes excitation optics 420. The excitation optics 420 include an excitation grating 426 to spatially disperse the broadband light beam by wavelength and an excitation lens 428 to direct the incident light to the sample 402. The excitation grating 426 forms the structured excitation profile 404, and thus, the excitation optics 420 disperse the broadband light beam to strike the sample 402 as incident light in a structured excitation profile 404. Further examples of structured excitation profiles 404 are discussed above with reference to FIG. 1.

The device 400 further includes analysis optics 440. The analysis optics 440 include a collection lens 442 to collect scattered light scattered from the sample 402, a broadband or "full-color" filter 447 having a mask complementary to the structured excitation profile 404, an emission grating 446 to spatially disperse the collected scattered light, and a transmission lens 448 to direct the collected scattered light to a sensor 450 for analysis. Thus, the analysis optics 440 are to collect scattered light scattered by the incident light striking the sample 402, block Rayleigh scatter from the collected scattered light in a manner complementary to the structured excitation profile 404, and direct Raman scatter from the collected scattered light to a sensor 450 to generate a signal to form a Raman excitation map.

The broadband filter 447 includes a confocal stage. The confocal stage focuses the spectrally dispersed (and in some examples, collimated) light at an image plane. A mask structured to be complementary to the structured excitation profile 404 is located at the image plane to block Rayleigh scatter. In other examples, however, the mask may be located at any image plane following dispersion of the light, such as, for example, at or near the surface of the sensor 450.

If the structured excitation profile 404 is a "rainbow" line as illustrated, the Rayleigh scatted light becomes a nearly diagonal line at the image plane, and thus the mask may conform to this nearly diagonal line to block the corresponding Rayleigh scatter. The mask may include, for example, a nearly diagonal edge which blocks the Rayleigh scattered light and passes the Raman scattered light. The mask may include, as another example, a positioned hole, edge, or slit to block the Rayleigh scatter and pass the Raman scatter. However, it is to be understood that other structured masks may be used which are complementary to other structured excitation profiles 404. Further, in examples in which the structured excitation profile 404 includes spatial and spectral dispersion, the mask may include spectral filtering to match a spatially and spectrally varying structured excitation profile 404. As another example, the mask may include polarization filtering to match a spatially and polarization varying structured excitation profile 404. It is contemplated that the broadband filter 447 may be used to analyze Stokes scattering, anti-Stokes scattering, or both.

The excitation grating 326 and emission grating 346 may be volume phase holographic (VPH) gratings.

The excitation optics 420 may further include a clean-up filter 422 prior to the excitation grating 426 to eliminate photons at unwanted wavelengths, such as in the near infrared (NIR) range, which may be generated by the broadband light source 410, and which may constitute noise in the system.

In some examples, the broadband light source 410 may include a supercontinuum broadband light source, and thus the broadband light beam may include collimated broadband light. Further, the analysis optics 440 may include a confocal stage to focus the collected scattered light at a focal plane, re-disperse, and re-collimate the collected scattered light prior to the blocking of Rayleigh scatter.

Figure 5:
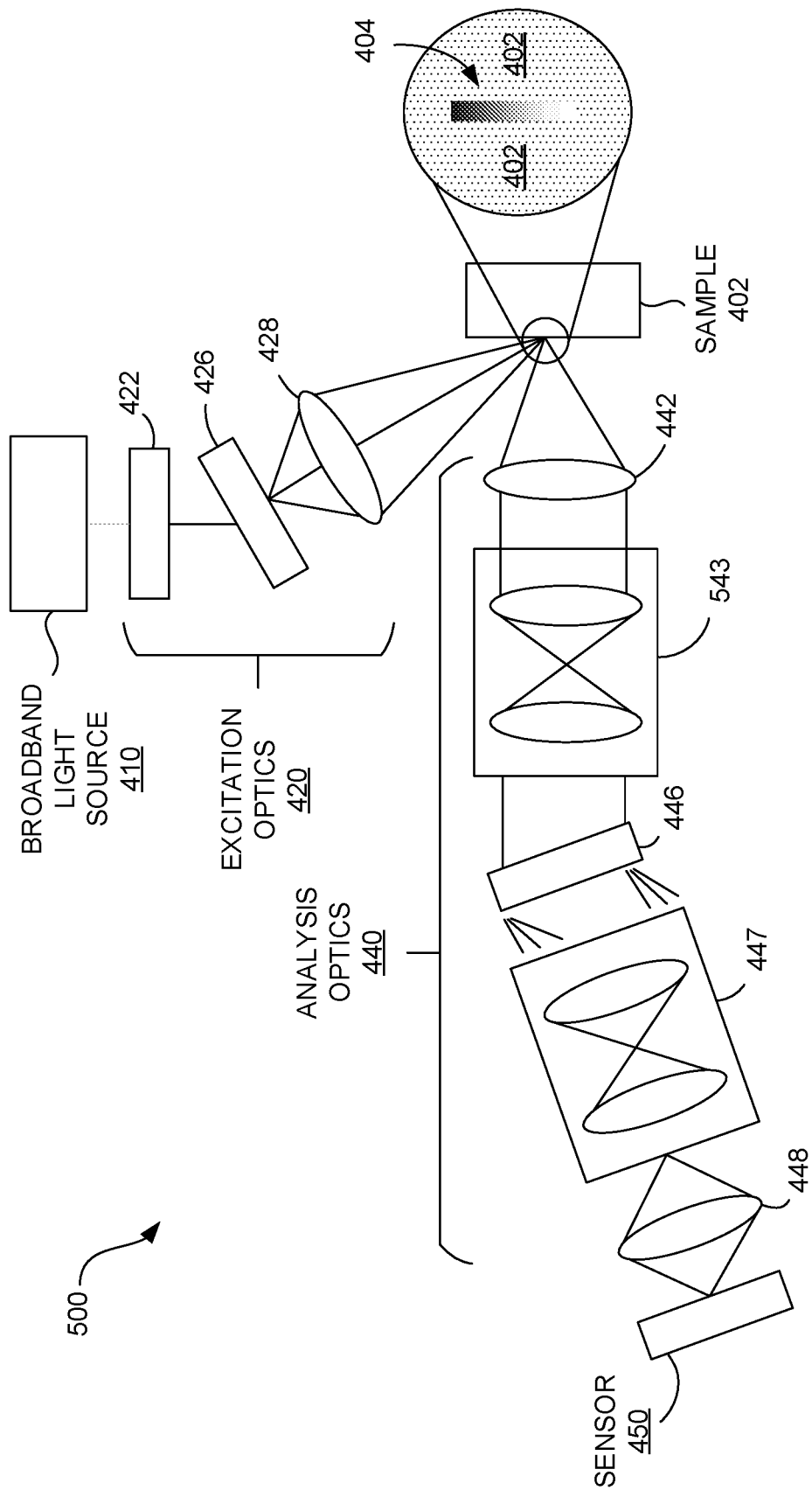
FIG. 5 is a schematic diagram of another example device to perform Raman spectroscopy with a structured excitation profile to obtain a Raman excitation map, the device including a confocal stage.

FIG. 5 is a schematic diagram of another example device 500 to perform Raman spectroscopy with a structured excitation profile to obtain a Raman excitation map. The device 500 is similar to the device 400 of FIG. 4, and thus includes a broadband light source 410, excitation optics 420, and analysis optics 440. However, the device 500 further includes a confocal stage 543 prior to the emission grating 446 to focus the collected scattered light at a focal plane, re-disperse, and re-collimate the collected scattered light prior to the blocking of Rayleigh scatter. The confocal stage 543 contains a mask, such as a pinhole or a slit, at or near the confocal focus. This mask is used to block unwanted light such as stray Rayleigh scattering from areas that are not intended to be probed. This mask could also have spatially varying transmission properties which depend on wavelength or other properties of the scattered light.

Figure 6:
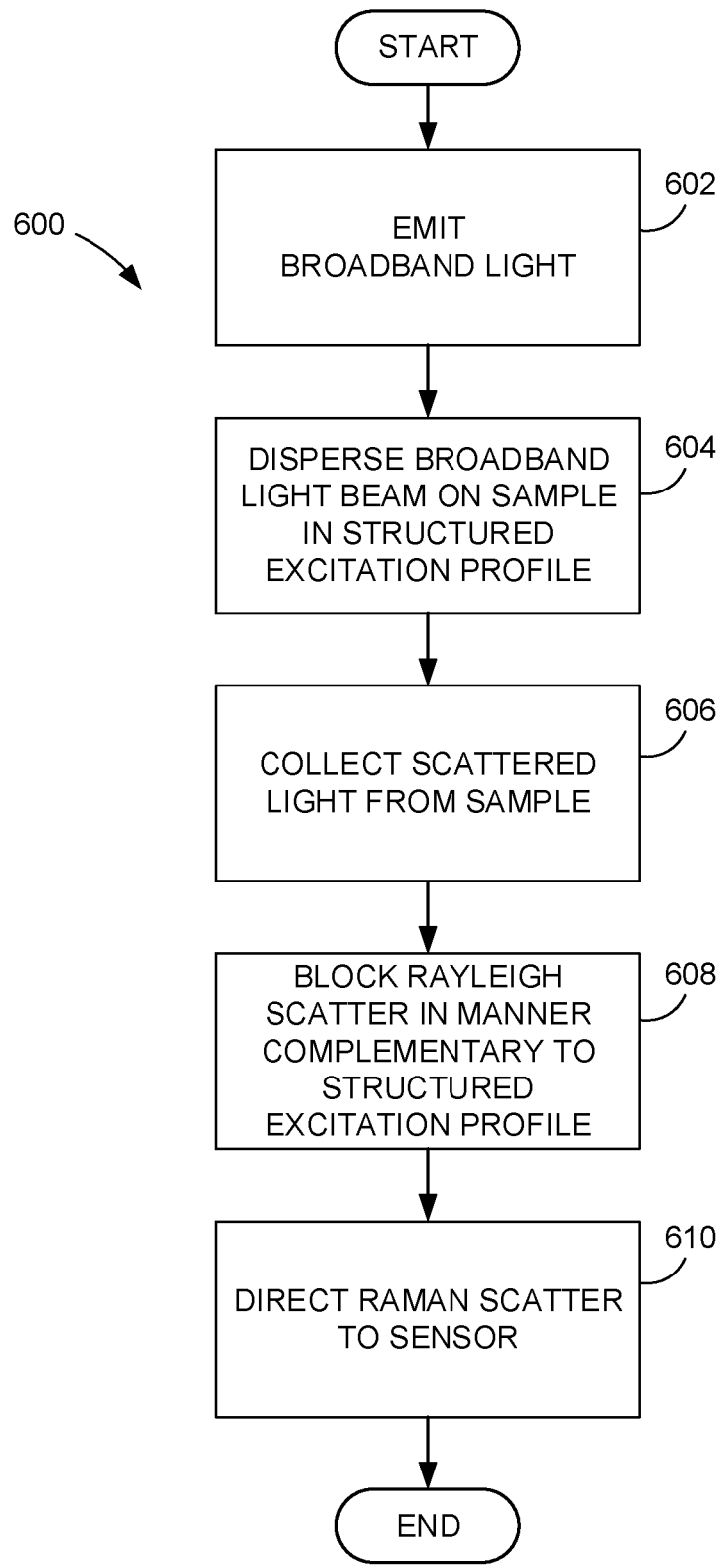
FIG. 6 is a flowchart of an example method to perform Raman spectroscopy with a structured excitation profile to obtain a Raman excitation map.

FIG. 6 is a flowchart of an example method 600 to perform Raman spectroscopy with a structured excitation profile to obtain a Raman excitation map. The method 600 may be performed with any of the devices discussed herein, such as the device 100 of FIG. 1, the device 300 of FIG. 3, the device 400 of FIG. 4, and the device 500 of FIG. 5. However, this is not limiting, and the method 600 may be performed with other devices.

At block 602, a broadband light beam is emitted. At block 604, the broadband light beam is dispersed to strike a sample as incident light according to a structured excitation profile. At block 606, the scattered light scattered by the incident light striking the sample is collected. At block 608, Rayleigh scatter from the collected scattered light is blocked in a manner complementary to the structured excitation profile. At block 610, Raman scatter from the collected scattered light is directed to a sensor to generate a signal to form a Raman excitation map.

The structured excitation profile may include a spatial dispersal of the incident light by wavelength, or may include dispersal according to another property as discussed herein. Further, the method 600 may further comprise collimating the broadband light beam prior to dispersing the broadband light beam, and focusing the collected scattered light at a focal plane, re-dispersing, and re-collimating the collected scattered light prior to blocking Rayleigh scatter from the collected scattered light. Thus, a Raman excitation map may be obtained by simultaneously testing of a range of wavelengths against a sample using broadband light dispersed according to a structured excitation profile, with Rayleigh scatter being blocked in a manner complementary to the structured excitation profile. A sample may thereby be analyzed for broadband or "full-color" Raman spectroscopy with little to no moving parts, thereby increasing the speed and reducing the cost with which Raman excitation maps may be obtained.

It is emphasized that several different structured excitation profiles are contemplated, including structured excitation profiles having a combination of property mappings. For example, a structured excitation profile may include a combination of spectral and spatial mapping. One way to achieve such a structured excitation profile is with a device having a stepwise short-wave pass filter in a confocal configuration in the excitation optics, and a complementary stepwise long-wave pass filter at the focus of a confocal lens in the analysis optics. The steps in bandpass in the filters are matched to a spatial distribution of the structured excitation profile. By way of example, a 633 nm short-wave pass filter (or bandpass filter) maybe used in combination with 633 nm long-wave pass filter, a 532 nm short-wave pass filter may be used in combination with a 532 nm long-wave pass filter, and so on.

As another example of a device using a structured excitation profile with a combination of spectral and spatial mapping, device may include one or more linear variable edge filters at the focus of a confocal lens in excitation optics and one or more complementary variable edge filters in the analysis optics. In the excitation optics, the linear variable edge filter may be a linearly variable line pass filter, or linearly variable short-wave pass filter. In the analysis optics, the linear variable edge filter may be a linearly variable long-wave pass filter to filter Stokes Raman scatter.

Several other structured excitation profiles having combinations of property mappings are contemplated, including structured excitation profiles having combinations of spatial, spectral, temporal, polarization, intensity, other photonic properties, and other properties of light.

Further, additional optical configurations of the devices herein are complicated. For example, although the examples shown in FIGS. 1, 3, 4, and 5 show devices with separate excitation and analysis optics, it is contemplated that in some examples the excitation and analysis optics may share at least some optical elements and a portion of the excitation and analysis beam lines may overlap. An example of such a device is shown in FIG. 7.

Figure 7:
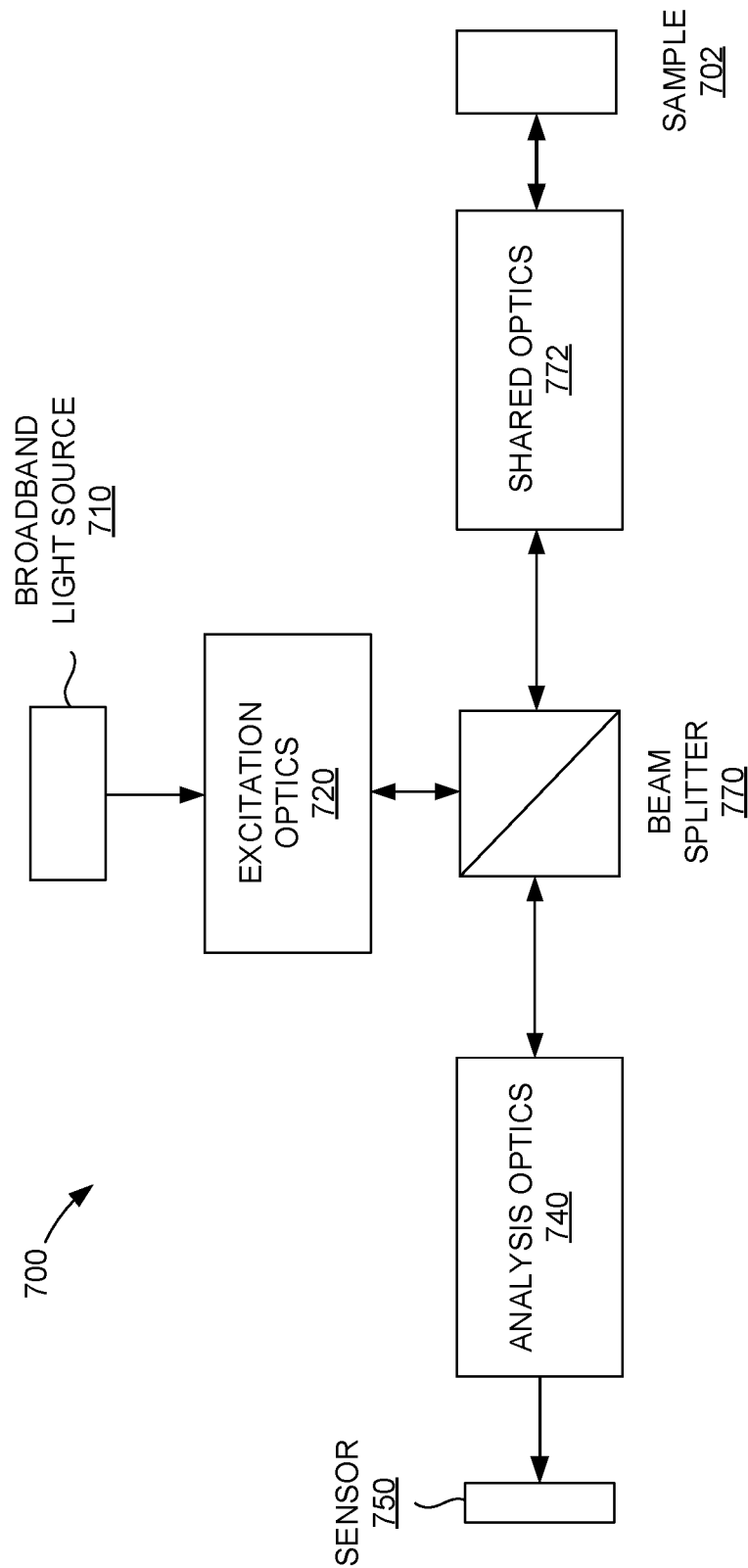
FIG. 7 is a schematic diagram of another example device to perform Raman spectroscopy with a structured excitation profile to obtain a Raman excitation map, the device including a beam splitter and shared optics for collection and excitation.

FIG. 7 is a schematic diagram of another example device 700 to perform Raman spectroscopy with a structured excitation profile to obtain a Raman excitation map. The device 700 may be similar to the device 100 of FIG. 1 with like elements numbered in the "700" series rather than the "100" series, and thus includes a broadband light source 710, excitation optics 720, analysis optics 740, and a sensor 750, to obtain a Raman excitation map of a sample 702. For further description of these elements, reference to the description of the device 100 may be made. However, in contrast to the device 100 of FIG. 1, in the device 700, a beam splitter 770 is used to split light beams into excitation beam lines and analysis beam lines for the excitation optics 720 and analysis optics 740 respectively. Further, shared optics 722 contains optical elements used for a portion of both excitation of the sample 702 and collection from the sample 702.

The beam splitter 770 may provide the structured excitation profile by applying a spatial, spectral, or a pattern according to any other property, to the excitation and analysis light paths. Thus, the beam splitter 770 may include a complementary element to block unwanted Rayleigh scatter and to pass the desired Raman scatter. For example, where the structured excitation profile is spatial, the beam splitter 770 may include a mirrored dot which reflects excitation light and passes other light. Other examples include where the structured excitation profile includes a knife edge, a dichroic beam splitter, or a polarization filter.

Figure 8:
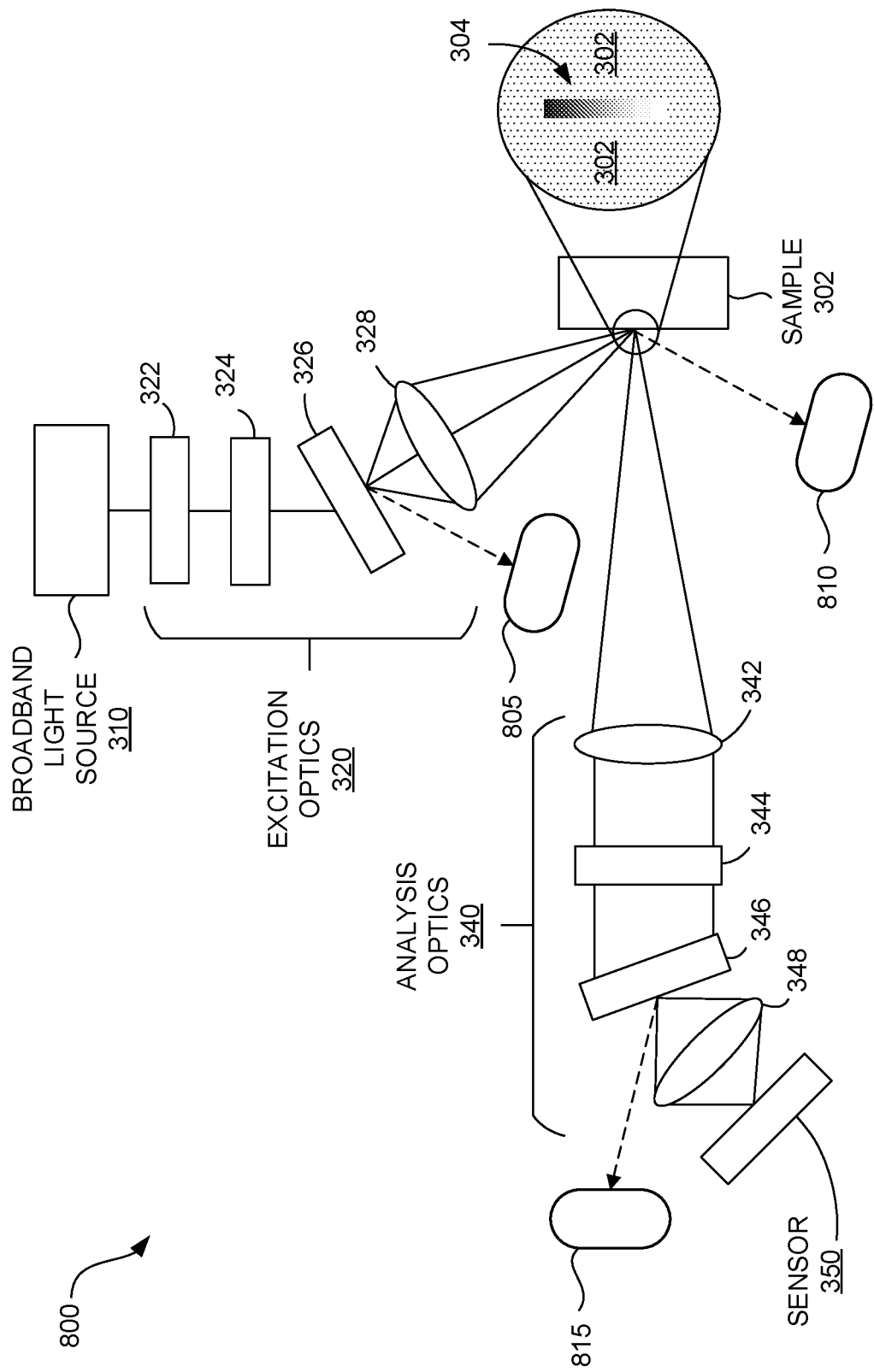
FIG. 8 is a schematic diagram of yet another example device to perform Raman spectroscopy with a structured excitation profile to obtain a Raman excitation map.

FIG. 8 is a schematic diagram of yet another example device 800 to perform Raman spectroscopy with a structured excitation profile to obtain a Raman excitation map. Device 800 may be similar to device 300, with a difference being that device 800 comprises beam dumps 805, 810, and 815. Beam dumps may also be described as beam blocks or beam blockers. These beam dumps may absorb or otherwise reduce stray or unwanted beams of light in device 800. Reducing the unwanted beams of light may reduce optical artifacts or other noise in the operation of device 800.

Beam dump 805 may absorb or reduce unwanted beams of light emanating from excitation grating 326. Beam dump 810, in turn, may absorb or reduce unwanted beams of light emanating from sample 302. Moreover, beam dump 815 may absorb or reduce unwanted beams of light emanating from emission grating 346. The depiction in FIG. 8 of the relative orientation of the stray beams and beam dumps 805, 810, and 815 is for illustrative purposes, and it is contemplated that in some examples, the relative orientation of the stray beams and the beam dumps may be different than those shown in FIG. 8.

In addition, while FIG. 8 shows three stray beams emanating from excitation grating 326, sample 302, and emission grating 346 and their corresponding beam dumps, it is contemplated that in some examples one or more stray beams may emanate from other components of device 800, and that device 800 may have a corresponding beam dump for one or more of these stray beams.

Furthermore, in some examples, device 800 may comprise a camera combined with, or instead of, beam dump 815. This camera may be used to capture the zero order (undiffracted) image of the sample. Such a camera may be used to view the sample, and may allow device 800 or its operator to adjust or maintain optical focus on the sample. In addition, the view provided by this camera may be used to by an operator of device 800 to detect and avoid unwanted light sources or other optical artifacts. Moreover, the view provided by this camera may be used by the operator of device 800 to detect and avoid contaminated, low quality, or otherwise unrepresentative portions of the sample.

Moreover, while the beam dumps and camera are described in relation to FIG. 8, it is contemplated that in some examples the other devices described herein may also have similar beam dumps and/or cameras.

In addition, in some examples, the light source may comprise a supercontinuum light source (SC) such as an NKT Photonics™ SuperK Extreme™ High Power Super Continuum White Light Laser (EXR-15), and the like. Moreover, in some examples, filter 322 may comprise a folded cavity with a visible band high reflecting mirror slightly tilted from normal, and the like. This may allow multiple reflections before transmission and so may act as a high rejection bandpass filter, passing the visible light but not the strong near infrared (NIR) which is a source of heat, and background for Raman Scattering (RS).

Furthermore, in some examples, filter 324 may comprise a short wave pass edge filter designed for anti-Stokes RS spectroscopy at 633 nm made by Indian Spectral Technologies™, and the like. Moreover, in some examples, the excitation grating may comprise a 1200 lines/mm holographic transmission grating (made by Wasatch Photonics™), and the like. In addition, in some examples, the excitation lens may comprise a 10× 0.26 numerical aperture long working distance NIR microscope objective (ExL, Mitutoyo™), and the like.

Moreover, in some examples, the collection lens may comprise a 10× 0.45 numerical aperture long working distance microscope objective (EmL, Edmund Optics™), and the like. In addition, in some examples, filter 344 may comprise a long wave pass edge filter designed for Stokes Raman spectroscopy at 633 nm (EmF, Semrock™), and the like. In addition, in some examples, the emission grating may comprise a 1200 lines/mm holographic transmission grating (Wasatch Photonics™), and the like.

Furthermore, in some examples, the transmission lens may comprise a 75 mm focal length achromatic lens (Thorlabs™), and the like. In some examples, sensor 350 may comprise a 5.5 megapixel cooled CMOS detector (Andor Neo™ 5.5), and the like. Moreover, in some examples, the camera combined with, or used in place of, beam dump 815 may comprise a room temperature megapixel color webcam (Edmund Optics™), and the like. In some examples, such a color webcam may be used to observe the structure of the illumination and may also be used to calibrate the color of the illumination as it varies across the sample.

The above list of components is provided as an example, and it is contemplated that other components may also be used.

In some examples, increasing the on-time in the duty cycle of the broadband light source may allow for enhancing the spectral resolution of the devices described herein. For example, the on-time may be increased by using a broadband light source that has a relatively longer pulse duration or is a continuous-wave light source.

In addition, in some examples where the light source comprises a supercontinuum light that is highly broadband, what determines the wavelength range may be the dispersion of the excitation grating and the size of the excitation lens' entrance pupil, or any other such obstruction in the optical path. Physically, the grating disperses the collimated white light supercontinuum beam, converting wavelength into angle. The range of wavelengths in the illumination line is set geometrically by this angle, the diameter of the beam, and the size of the entrance pupil going into the excitation lens. The smaller the grating dispersion the larger the bandwidth, and the larger the entrance pupil, and the closer it is to the grating, the larger the bandwidth. Higher magnification excitation lenses tend to have smaller entrance pupils, so spatial resolution may be reduced if bandwidths are increased by increasing entrance pupil diameters. It is contemplated that in some examples one or more of the grating dispersion and the entrance pupil may be made larger or smaller. Lower dispersion gratings lead to smaller angles, and so higher bandwidth, but lower dispersion gratings have lower spectral resolution, so there may be a trade-off between resolution and bandwidth if the grating dispersion is reduced to obtain a larger range of wavelengths.

Furthermore, in some examples, the devices described herein may be calibrated before or during operation. In some examples, the emission wavelength may be calibrated with narrow band pass or edge filters with known bands or edges. The excitation wavelength may be calibrated using other band or edge pass filters. Alternatively, and/or in addition, wavelengths and Raman shifts may be calibrated using known spectral peaks such as the G band.

Compared to other spectroscopic methods such as those based on photoluminescence, RS-based methods and devices may experience challenges related to factors such as: the relatively weak RS signal; the strong, unwanted Rayleigh background; the need for relatively higher spectral resolution; the potential for complications due to a laser light source heating the sample or other components of the device; the more complicated data processing that is required; and the like. The methods and devices described herein address at least some of these challenges.

The methods and devices described herein allow for reducing the time and complexity of obtaining Raman excitation maps (REMs). Reducing the time needed for the mapping may allow REMs to be used as more routine characterization tools. Furthermore, two independent dimensions of data (vibrational, electronic) may be obtained simultaneously, making these REMs more specific fingerprints than conventional one-dimensional RS spectra. As such, the REMs provided by the methods and systems described herein may be well suited as inputs into chemometric analysis systems.

Moreover, in RS one has to choose an instrument that operates at an appropriate wavelength. The supercontinuum light with its highly broadband wavelength range used in the methods and devices described herein provides enhanced versatility. The methods and devices described here may make it possible to obtain many or even all wavelengths of interest simultaneously. These aspects help take full advantage of resonance to obtain stronger signals and expanded spectral fingerprints.

Furthermore, from a photophysical perspective, resonant RS cross-sections are particularly difficult to evaluate, not only because of the need to characterize instrumental throughput and response, but because, being resonant, they can have sharp, non-linear laser wavelength dependences. The exact resonance wavelength and the breadth of the resonance can be sample environment dependent. In a single fixed wavelength measurement, intensity changes arise from many causes, including this wavelength dependence. Having a continuous REM (in real-time), which in some examples may be provided by the methods and systems described herein, may help reveal these effects and take them into account.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A device comprising:
  a broadband light source to emit a broadband light beam;
  excitation optics to disperse the broadband light beam to strike a sample as incident light according to a structured excitation profile;
  analysis optics to:
  collect scattered light scattered by the incident light striking the sample;
  block Rayleigh scatter from the collected scattered light in a manner complementary to the structured excitation profile; and
  direct Raman scatter from the collected scattered light to a sensor to generate a signal to form a Raman excitation map,
  wherein the broadband light source comprises a supercontinuum light source and the broadband light beam comprises collimated light.

2. The device of claim 1, wherein the structured excitation profile comprises a spatial dispersal of the incident light by wavelength.

3. The device of claim 2, wherein:
  the excitation optics includes a short-wave pass filter to filter the broadband light beam prior to dispersal; and
  the analysis optics includes a long-wave pass filter complementary to the short-wave pass filter to block corresponding Rayleigh scatter.

4. The device of claim 2, wherein the analysis optics includes a broadband filter to block the Rayleigh scatter, the broadband filter including a mask structured complementarily to the structured excitation profile.

5. The device of claim 1, wherein the analysis optics includes a collimator to re collimate the collected scattered light prior to blocking the Rayleigh scatter.

6. The device of claim 5, wherein the analysis optics includes a confocal stage to focus the collected scattered light to a focal plane, re-disperse, and re collimate the collected scattered light.

7. The device of claim 1, wherein the structured excitation profile comprises a spatial dispersal of the incident light by polarization.

8. The device of claim 1, wherein the structured excitation profile comprises a spatial dispersal of the incident light by intensity.

9. A device comprising:
  a broadband light source to emit a broadband light beam;
  excitation optics including a short-wave pass filter, an excitation grating, and an excitation lens, the excitation optics to disperse the broadband light beam to strike a sample as incident light in a structured excitation profile;
  analysis optics including a collection lens, a long-wave pass filter complementary to the short-wave pass filter of the excitation optics, an emission grating, and a transmission lens, the analysis optics to:
  collect scattered light scattered by the incident light striking the sample;
  block Rayleigh scatter from the collected scattered light in a manner complementary to the structured excitation profile; and
  direct Raman scatter from the collected scattered light to a sensor to generate a signal to form a Raman excitation map,
  wherein the broadband light source comprises a supercontinuum broadband light source and the broadband light beam comprises collimated broadband light; and the analysis optics include a confocal stage to focus the collected scattered light at a focal plane, re-disperse, and re-collimate the collected scattered light.

10. A device comprising:
  a broadband light source to emit a broadband light beam;
  excitation optics including an excitation grating and an excitation lens, the excitation optics to disperse the broadband light beam to strike a sample as incident light in a structured excitation profile;
  analysis optics including a collection lens, a broadband filter having a mask complementary to the structured excitation profile, an emission grating, and a transmission lens, the analysis optics to:
  collect scattered light scattered by the incident light striking the sample;
  block Rayleigh scatter from the collected scattered light in a manner complementary to the structured excitation profile; and
  direct Raman scatter from the collected scattered light to a sensor to generate a signal to form a Raman excitation map,
  wherein the broadband light source comprises a supercontinuum broadband light source and the broadband light beam comprises collimated broadband light; and the analysis optics include a confocal stage to focus the collected scattered light at a focal plane, re-disperse, and re-collimate the collected scattered light.

11. A method comprising:
  emitting a broadband light beam;
  dispersing the broadband light beam to strike a sample as incident light according to a structured excitation profile;

collecting scattered light scattered by the incident light striking the sample;
blocking Rayleigh scatter from the collected scattered light in a manner complementary to the structured excitation profile;
directing Raman scatter from the collected scattered light to a sensor to generate a signal to form a Raman excitation map;
collimating the broadband light beam prior to dispersing the broadband light beam; and
focusing the collected scattered light at a focal plane, re-dispersing, and re-collimating the collected scattered light prior to blocking Rayleigh scatter from the collected scattered light.

12. The method of claim 11, wherein the structured excitation profile comprises a spatial dispersal of the incident light by wavelength.

* * * * *